Figure 1:
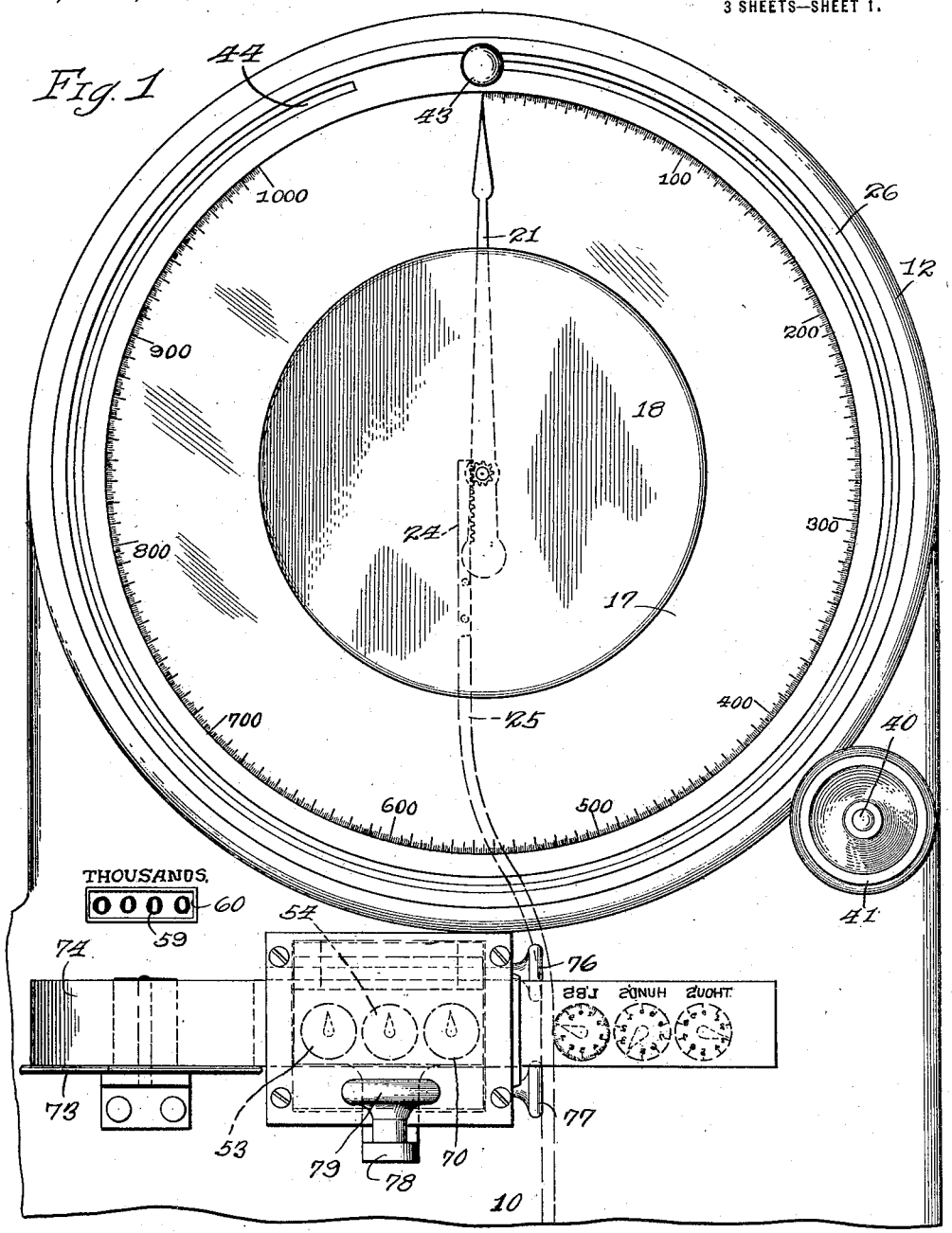

L. A. OSGOOD.
WEIGHING APPARATUS.
APPLICATION FILED JUNE 5, 1914. RENEWED JUNE 21, 1916.

1,198,652.

Patented Sept. 19, 1916.
3 SHEETS—SHEET 1.

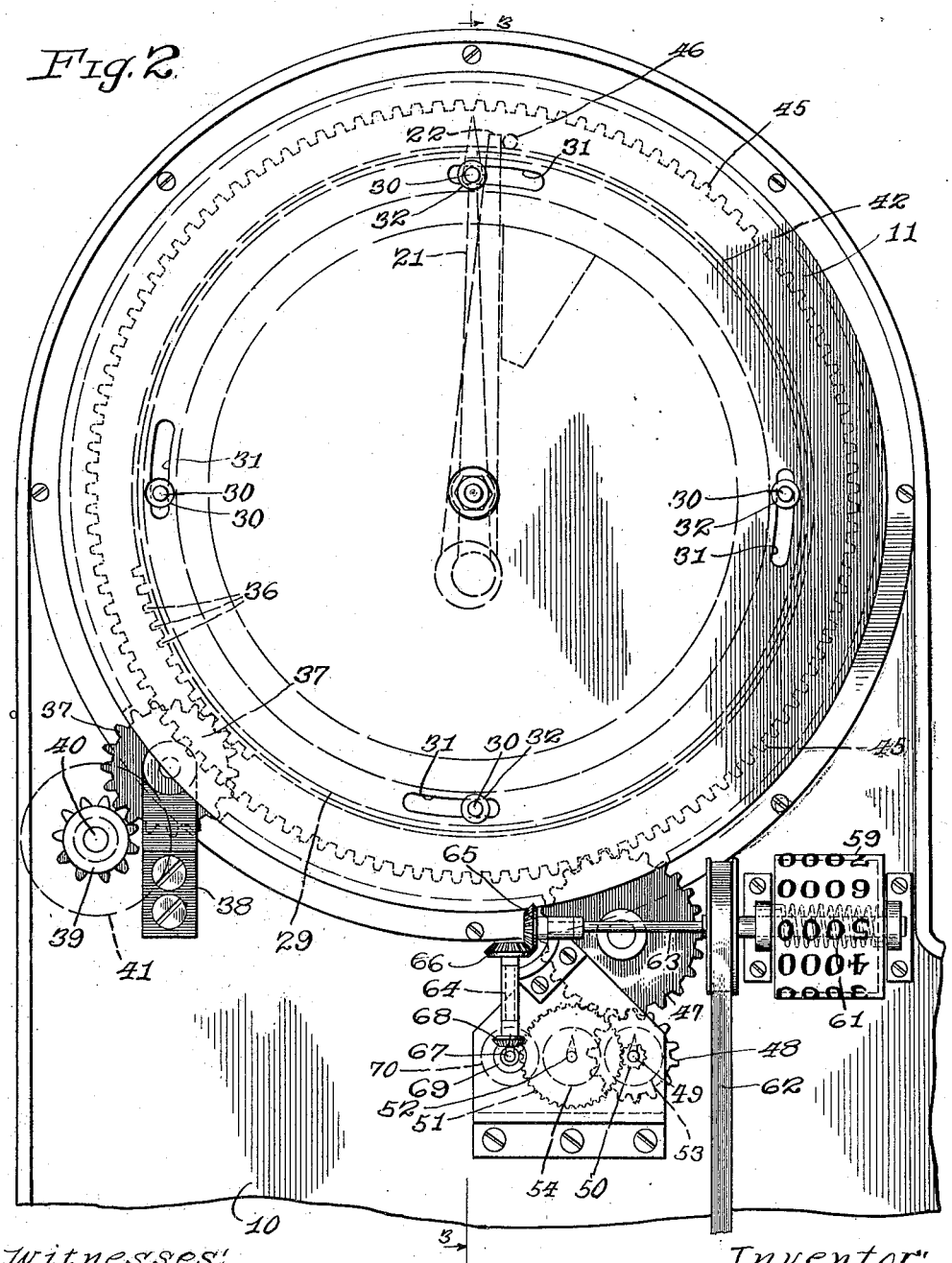

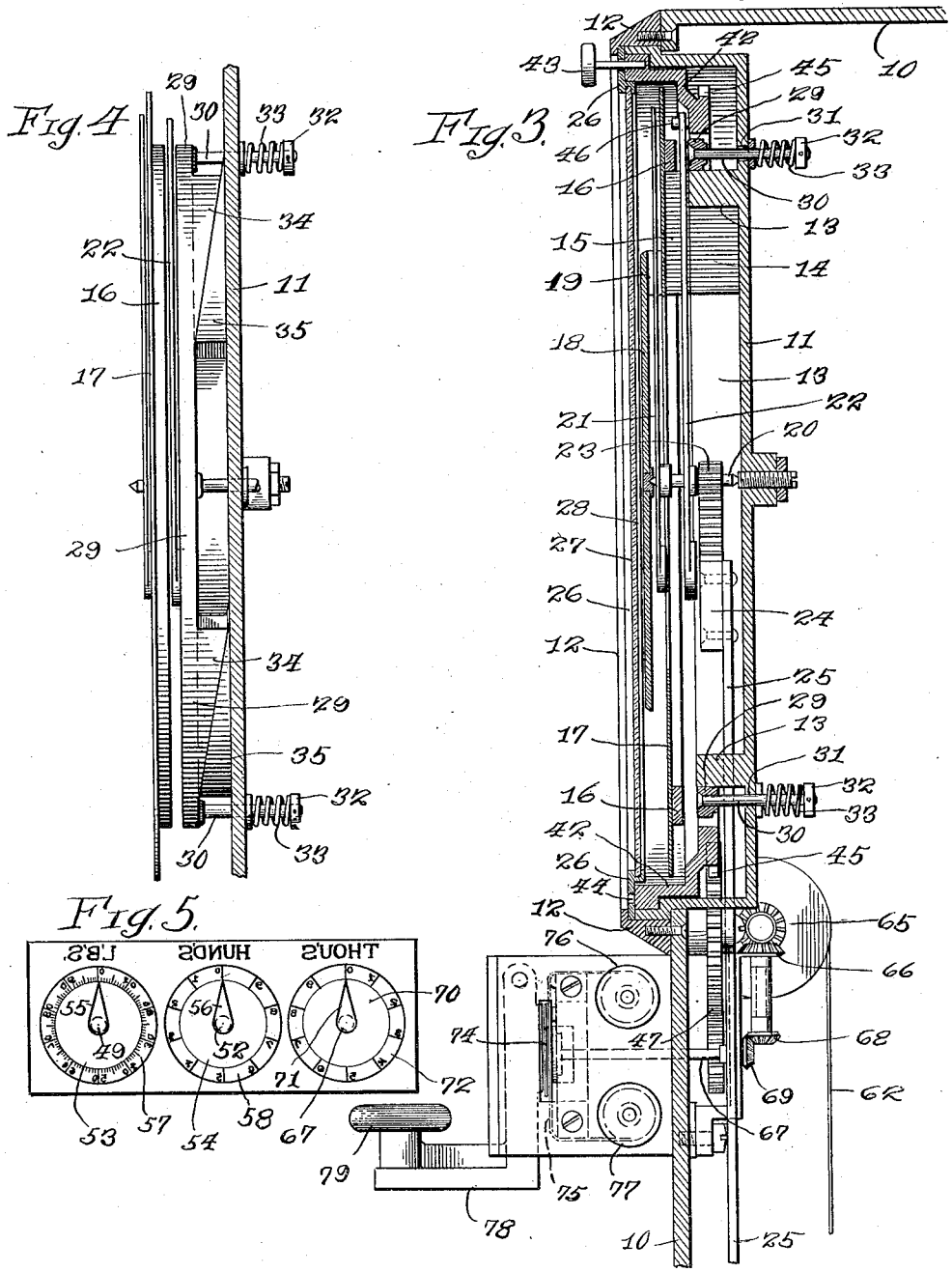

UNITED STATES PATENT OFFICE.

LOUIS ASHLEY OSGOOD, OF CHICAGO, ILLINOIS, ASSIGNOR, BY DIRECT AND MESNE ASSIGNMENTS, TO AMERICAN AUTOMATIC SCALE COMPANY, OF CHICAGO, ILLINOIS, A CORPORATION OF ILLINOIS.

WEIGHING APPARATUS.

1,198,652.      Specification of Letters Patent.      Patented Sept. 19, 1916.

Application filed June 5, 1914, Serial No. 843,166. Renewed June 21, 1916. Serial No. 105,082.

*To all whom it may concern:*

Be it known that I, LOUIS ASHLEY OSGOOD, a citizen of the United States, residing at Chicago, in the county of Cook and State of Illinois, have invented certain new and useful Improvements in Weighing Apparatus, of which the following is a specification, reference being had to the accompanying drawings.

This invention relates to weighing apparatus of the type in which an indicating member is moved over a graduated scale, the weight of the articles being weighed being indicated by the extent of movement of the indicating member, and it has for one of its objects the provision of recording means for recording the weight such that the delicacy of the weighing shall not in any way be cut down by the use of the recording means. As has been fully demonstrated in practice in connection with weighing apparatus comprising a hand rotatable about a dial for indicating weight, whenever a recording mechanism is added to the indicating-hand so as to swing therewith about the dial, the resistance of the indicating-hand is made so great that accurate results cannot be obtained.

It is one of the objects of my invention to provide a scale of this type comprising a light indicating member adapted to swing freely about the dial to indicate the weight as accurately as if no recording device were used, a recording device being provided in connection therewith which shall not in any way affect the free swinging of the indicating member.

It is another object of my invention to improve devices of this type in sundry details hereinafter pointed out.

The preferred means by which I have accomplished these results are illustrated in the accompanying drawings and are hereinafter specifically described. That which I believe to be new is set forth in the claims.

In the drawings,—Figure 1 is a front view of a dial and connected parts embodying my improved construction; Fig. 2 is a rear view of the parts shown in Fig. 1; Fig. 3 is a central vertical section taken on line 3—3 of Fig. 2; Fig. 4 is a view showing the cams employed for locking the indicating-hand against rotation, as hereinafter described; and Fig. 5 is a front view of the printing devices of the recording mechanism.

Referring to the several figures of the drawings, in which corresponding parts are indicated by the same reference characters,— 10 indicates a portion of the casing of a weighing apparatus having mounted in a circular opening therein a drum 11 secured in place by a ring 12 which is secured by means of screws to the part 10. The rear wall of the drum 11 is provided with a ring 13, in the construction shown formed with the rear wall of the drum, the ring 13 and wall 11 being provided at one point with a block 14 formed therewith. Secured to the drum 11 by means of a block 15 engaging the block 14 of the drum is a ring 16, in the construction shown formed integrally with the block 15. Secured to the ring 16 is a dial-plate 17, to the front face of which, opposite the blocks 14—15, is secured a plate 18 by means of a block 19 formed integrally with said plate. Revolubly mounted between the plate 18 and the rear wall of the drum 11 is a spindle 20 having mounted thereon an indicating-hand 21 adapted to revolve in front of the dial 17 and an auxiliary hand 22 adapted to revolve adjacent to the ring 16 in rear thereof, both of said hands being adapted to make a complete rotation with the spindle 20, except as they are stopped by the supporting blocks 15 and 19. The spindle 20 is provided with a pinion 23, with which meshes a rack-bar 24 carried by a link 25 which is connected with any suitable means for actuating it proportionately relative to the weight of an article or articles being weighed. The link 25 may be taken to correspond in a general way with the link 51 of the weighing apparatus shown in my application for patent of the United States filed on May 2, 1914, Serial No. 835,870, in the construction of which the beam 25 to which the link 51 is connected is controlled by the weights 44—47, as is set forth in said application. Inasmuch as the construction and operation of devices of this type are well understood in the art, it is believed to be unnecessary to illustrate them herein.

26 indicates a ring held in position upon the drum 11 by the ring 12 and having suitably secured to it a glass 27 for closing the front end of the drum,—the glass 27, in the construction shown, being held in place by a ring 28 secured to the ring 26.

As will be readily understood, when the link 25 is moved upward, actuated by the weight of the articles being weighed, as above set forth, the spindle 20 and the indicating-hand 21 will be rotated together to bring the indicating-hand 21 in position upon the dial 17 to indicate the weight, as is usual in weighing apparatus of this type. At the same time, the auxiliary hand 22 is rotated in the same direction adjacent to the ring 16. For recording purposes, I have provided means for locking the hand 22 against swinging after the indicating-hand has swung freely to the weight-indicating position, the hand 22 being locked firmly in position for the purpose of having a rigidly-positioned part relative to which the printing mechanism can be moved to a corresponding position. For the purpose of locking the hand 22 in rigid position, I have provided a ring 29 revolubly mounted about the ring 13, and also adapted to slide toward and from the rear wall of the drum 11 about said ring 13. The ring 29 is provided with a plurality of pins 30, extending rearwardly therefrom, passing through slots 31 in the rear wall of the drum. Mounted upon each of the pins 30 between the wall of the drum 11 and a collar 32 mounted upon the rear end of the pin is a spring 33, said springs serving normally to hold the ring 29 in its rearmost position, as hereinafter set forth. As best shown in Fig. 4, the ring 29 is provided with a plurality of cam-lugs 34, fixed on its rear face, coöperating with cam-lugs 35 mounted upon the front face of the rear wall of the drum 11. As best shown in Fig. 2, the ring 29 is provided at one point with gear-teeth 36 with which meshes a gear 37 revolubly mounted upon a bracket 38 carried by the casing 10. Meshing with the gear 37 is another gear 39 revolubly mounted upon a shaft 40, journaled in the casing 10, provided on its front end with a hand-grip 41. As will be readily understood, an appropriate turning of the shaft 40 through the medium of the hand-grip 41 serves to revolve the ring 29, forcing said ring forward by reason of the interaction of the cams 34—35, clamping the hand 22 firmly between said ring 29 and the ring 16 and thereby holding the hand against rotation upon its axis.

Revolubly mounted in the drum 11 is a ring 42, being adapted to be revolved by means of a pin 43 mounted in said ring and extending through a slot 44 which extends almost entirely about the ring 26. Mounted upon the ring 42 is a gear-wheel 45, in the construction shown said gear-wheel being formed integrally with the ring 42. Extending from the front face of the gear portion 45 of said ring is a pin 46 adapted to engage the hand 22 upon the rotation of the ring 42. With the hand 22 locked in position by an appropriate turning of the hand-grip 41 after the indicating-hand 21 has come to its balanced position in the course of a weighing operation, the operator grasps the pin 43 and turns the ring 42 and the gear 45 until the pin 46 is brought into contact with the hand 22, the gear 45 being thus turned into a position corresponding to that of the indicating-hand 21, without, however, having in any way hindered the delicate positioning of the hand 21.

Coming now to the printing mechanism which is adapted to be turned through the rotation of the gear 45 into proper position to record the weight indicated by the hand 21, 47 indicates a gear meshing with the gear 45, driving, in turn, a gear 48 mounted upon a revolubly-mounted shaft 49. The shaft 49 is provided with a pinion 50 which meshes with a gear 51 mounted upon a shaft 52. In the construction shown, the gear 48 is so proportioned as to be given ten complete rotations for each movement of the hand 21 from the zero point in clockwise direction in Fig. 1 to the point marked 1000 therein. The gear 51 and the pinion 50 have a 10-to-1 relation whereby the shaft 52 is given one complete rotation for every ten rotations of the shaft 49. Mounted upon the shafts 49—52 are drums 53—54 provided on their front faces with hands 55—56, respectively. About the drums 53—54 are mounted rings 57 and 58, the ring 57 being graduated to 100 and the ring 58 being graduated to 10. The hands 55—56 carried by the drums 53—54 and the numbers and graduations on the rings 57—58 are in raised relation so as to serve for stamping purposes, as hereinafter described.

By the use of the mechanism just described, as will be readily understood, when the hand 21 moves from the zero point to the point marked 100 the hand 55 will be given a complete rotation relative to the ring 57 and the hand 56 will be moved from 0 to 1. Upon a movement of the hand 21 from 100 to 200 the hand 55 will be given a second complete rotation and the hand 56 will be moved from 1 to 2. In other words, the position of the hand 56 relative to the ring 58 always indicates the even number of hundreds of pounds as indicated by the hand 21, while the position of the hand 55 relative to the ring 57 indicates accurately the exact number of pounds in addition to the even hundreds.

As has been set forth above, the recording mechanism of this application is especially designed for use with such a weighing apparatus as that shown in my application Serial No. 835,870, in which a dial of the type shown herein is used for indicating the weight in addition to even thousands and in which an independent indicating device is used for even thousands of pounds. A drum 59 is used in my present construction to indicate the even thousands of pounds as seen through a suitable opening 60 in the casing 10, as best shown in Fig. 1. The drum 60 is turned against the action of a spring 61 through the medium of a chain or link 62 corresponding to the chain 84 of my said application. In order to record also the even thousands of pounds as shown by the indicating drum 59, as well as recording the weight indicated by the hand 21, I have provided a shaft 63 rotatable with the drum 59 adapted to drive a shaft 64 through the medium of beveled gears 65—66, as best shown in Fig. 2, the rotation of the shaft 64 being transmitted, in turn, to a shaft 67 by the use of beveled gears 68—69. The shaft 67 has mounted upon it a drum 70 provided with an indicating-hand 71, similar to the hands 55—56, adapted to be rotated relative to a ring 72 similar to the rings 57—58 and graduated from 0 to 9. The shaft 67 is adapted to be rotated through the medium of the beveled gears so as to carry the hand 71 about the ring 72 to indicate even thousands of pounds, corresponding to the indication of the drum 59 through the slot 60.

Coming now to the means for making a record corresponding to the indication of the hands 55—56—71, 73 indicates a reel revolubly mounted adjacent to the drums 53—54—70 adapted to carry a roll of paper 74 the web from which extends over the faces of the drums 53—54—70, as best shown in Fig. 1. Extending between the web of paper 74 and said drums is an inking-ribbon 75 adapted to be transferred as desired from one to another of two reels suitably located relative to said drums and adapted to be rotated for changing the ribbon as desired by means of hand-grips 76—77. The web 74 is adapted to be brought forcibly into contact with the faces of the drums 53—54—70 by means of a bell crank lever 78, pivotally mounted adjacent thereto, carrying at its outer end a head 79 adapted to be given a suitable blow for forcing the web of paper and the inking ribbon into sharp contact with the raised portions of the recording devices, as will be readily understood.

As will be readily understood, when the weight has been properly recorded through the use of the mechanism just described, the web 74 may be pulled out and torn off, if desired, or the web can be again reeled for a permanent record, if desired. Upon the completion of the weighing operation, the gear 45 is turned back to normal position through the medium of the pin 43 and the hand 22 is unlocked by a turning of the hand-grip 41 in a reverse direction, as will be readily understood, the springs 33 serving to withdraw the ring 29 from its forward position as soon as the movement of the cams 34—35 will permit such action. The hands 55—56 and 71 are thus brought again to their zero position and the mechanism is in condition for another weighing operation.

By the use of a lightly-movable part such as my hand 22 for determining the weight, in combination with other means thereafter positioned by reference to the position which the lightly-movable part has taken, I am enabled to record the weight with as great accuracy as that with which the weight can be determined in a non-recording scale. Inasmuch as this expedient is new, so far as I am aware, it will be understood that I wish to claim it broadly, and the claims are to be constructed accordingly.

What I claim as my invention and desire to secure by Letters Patent is,—

1. In a weighing apparatus, the combination of a lightly-swinging hand adapted to swing in proportion to the weight by which it is actuated, recording means comprising a member movable independently about the same axis adapted for making successive records in proportion to successive movements of the said member from a predetermined normal position, and means for moving said independently-movable member into a position corresponding to that of the hand.

2. In a weighing apparatus, the combination of a lightly-swinging hand adapted to swing in proportion to the weight by which it is actuated, recording means comprising an independently-movable member adapted for making successive records in proportion to successive movements of the said member from a predetermined normal position, means for moving said independently-movable member manually, and means for indicating when said independently-movable member has reached a position corresponding to that of the hand.

3. In a weighing apparatus, the combination of a lightly-swinging hand adapted to swing in proportion to the weight by which it is actuated, a gear rotatable independently about the same axis, indicating devices adapted to be set by the rotation of said gear for indicating weights in proportion to successive movements of said gear from a predetermined normal position, and means for rotating said gear independently of the movement of said hand into a position corresponding to that of the hand.

4. In a weighing apparatus, the combination of a circular casing, a lightly-swinging hand mounted concentrically relative to said casing adapted to swing in proportion to the weight by which it is actuated, a ring revolubly mounted in said casing about the axis of said hand, indicating devices adapted to be set by the rotation of said ring for indicating weights in proportion to successive movements of said ring from a predetermined normal position, and means for rotating said ring independently of the movement of said hand into a position corresponding to that of the hand.

5. In a weighing apparatus, the combination of a lightly-swinging hand adapted to swing in proportion to the weight by which it is actuated, recording means comprising a member movable independently about the same axis adapted for making successive records in proportion to successive movements of the said member from a predetermined normal position, means for clamping said hand against swinging, and means controlled by the position of said hand when held against swinging adapted to limit the movement of said independently-movable member.

6. In a weighing apparatus, the combination of a circular casing, a lightly-swinging hand mounted concentrically relative to said casing adapted to swing in proportion to the weight by which it is actuated, a ring revolubly mounted in said casing about the axis of said hand, a gear adapted to rotate with said ring, indicating devices adapted to be set by the rotation of said gear for indicating weights in proportion to successive movements of said gear from a predetermined normal position, and means for rotating said ring and gear independently of the movement of said hand into a position corresponding to that of the hand.

7. In a weighing apparatus, the combination of a spindle, a lightly-swinging hand mounted on said spindle, a pinion mounted on said spindle, a rack-bar meshing with said pinion and adapted to be moved in proportion to the weight by which said rack-bar is actuated upon a weighing operation whereby said hand is likewise swung in proportion to such weight, means for clamping said hand against swinging, recording means comprising an independently-movable member adapted for making successive records in proportion to successive movements of the said member from a predetermined normal position, and means controlled by the position of said hand when held against swinging for limiting the movement of said independently-movable member.

8. In a weighing apparatus, the combination of a lightly-swinging hand adapted to swing in proportion to the weight by which it is actuated, a ring alongside of which said hand swings, means for moving said ring into contact with said hand for holding it against swinging, means for recording a weight comprising a setting mechanism adapted to be operated independently of movement of said hand, and means controlled by the position of said hand when held against swinging for limiting the movement of said setting mechanism.

9. In a weighing apparatus, the combination of a lightly swinging hand adapted to swing in proportion to the weight by which it is actuated, a pair of rings between which said hand swings, means for moving said rings relative to each other for clamping said hand against swinging, means for recording a weight comprising a setting mechanism adapted to be operated independently of movement of said hand, and means controlled by the position of said hand when held against swinging for limiting the movement of said setting mechanism.

10. In a weighing apparatus, the combination of a lightly-swinging hand adapted to swing in proportion to the weight by which it is actuated, a pair of rings between which said hand swings, means for rotating one of said rings, cam means adapted upon the rotation of said ring to cause the said ring to move toward the other one of said two rings for clamping said hand against swinging, means for recording a weight comprising a setting mechanism adapted to be operated independently of movement of said hand, and means controlled by the position of said hand when held against swinging for limiting the movement of said setting mechanism.

11. In a weighing apparatus, the combination of a stationary plate, a lightly-swinging hand adapted to swing in proportion to the weight by which it is actuated, a ring adjacent to which said hand swings held in fixed position relative to said stationary plate, a second ring movably mounted relative to said stationary plate upon the opposite side of said hand, means for rotating said second ring, cam means adapted upon a rotation of said second ring to cause the said ring to move toward said first-named ring for clamping said hand against swinging, means for recording a weight comprising a setting mechanism adapted to be operated independently of movement of said hand, and means controlled by the position of said hand when held against swinging for limiting the movement of said setting mechanism.

LOUIS ASHLEY OSGOOD.

Witnesses:
W. H. De Busk,
W. A. Furnner.

Copies of this patent may be obtained for five cents each, by addressing the "Commissioner of Patents, Washington, D. C."